US009048723B2

(12) United States Patent
Tsou et al.

(10) Patent No.: US 9,048,723 B2
(45) Date of Patent: Jun. 2, 2015

(54) ACTIVE FEEDBACK CONTROL INTEGRATED CIRCUIT APPLIED TO AN ALTERNATING CURRENT/DIRECT CURRENT CONVERTER AND OPERATION METHOD THEREOF

(71) Applicant: Leadtrend Technology Corp., Hsin-Chu (TW)

(72) Inventors: Ming-Chang Tsou, Hsin-Chu (TW); Meng-Jen Tsai, Hsin-Chu (TW)

(73) Assignee: Leadtrend Technology Corp., Science-Based Industrial Park, Hsin-Chu (TW)

( * ) Notice: Subject to any disclaimer, the term of this patent is extended or adjusted under 35 U.S.C. 154(b) by 43 days.

(21) Appl. No.: 13/802,885

(22) Filed: Mar. 14, 2013

(65) Prior Publication Data
US 2014/0043876 A1 Feb. 13, 2014

(30) Foreign Application Priority Data
Aug. 13, 2012 (TW) .............................. 101129236 A

(51) Int. Cl.
*H02M 3/335* (2006.01)
*H02M 7/04* (2006.01)
*H02M 1/00* (2006.01)

(52) U.S. Cl.
CPC ........ *H02M 7/04* (2013.01); *Y02B 70/16* (2013.01); *H02M 3/33507* (2013.01); *H02M 2001/0035* (2013.01)

(58) Field of Classification Search
CPC .......... H02M 3/335; G05F 1/46; G05F 1/575; G05F 1/571
USPC ................................................. 363/21.01–26
See application file for complete search history.

(56) References Cited

U.S. PATENT DOCUMENTS

| 5,982,313 | A * | 11/1999 | Brooks et al. ................. 341/143 |
| 7,679,939 | B2 * | 3/2010 | Gong ......................... 363/21.18 |
| 2012/0039098 | A1 * | 2/2012 | Berghegger ............... 363/21.13 |

* cited by examiner

*Primary Examiner* — Adolf Berhane
*Assistant Examiner* — Yemane Mehari
(74) *Attorney, Agent, or Firm* — Winston Hsu; Scott Margo

(57) ABSTRACT

An active feedback control integrated circuit applied to an alternating current/direct current converter includes a feedback pin, an operation unit, a control unit, and a controlled-current generation unit. The feedback pin is used for receiving a feedback current of an output feedback unit of the alternating current/direct current converter. The operation unit is used for generating an operation signal according to the feedback current. The control unit is coupled to the operation unit for generating a current control signal. The controlled-current generation unit is coupled to the control unit for generating a controlled current to the feedback pin according to the current control signal.

22 Claims, 12 Drawing Sheets

US 9,048,723 B2

ACTIVE FEEDBACK CONTROL INTEGRATED CIRCUIT APPLIED TO AN ALTERNATING CURRENT/DIRECT CURRENT CONVERTER AND OPERATION METHOD THEREOF

BACKGROUND OF THE INVENTION

1. Field of the Invention

The present invention relates to an active feedback control integrated circuit applied to an alternating current/direct current converter and an operation method thereof, and particularly to an active feedback control integrated circuit and an operation method thereof that can decrease power loss of the active feedback control integrated circuit, a switch of a primary side of the alternating current/direct current converter, and an output feedback unit of a secondary side of the alternating current/direct current converter by decreasing a current flowing through a feedback pin of the active feedback control integrated circuit in a burst mode or a deep sleep mode.

2. Description of the Prior Art

Nowadays, a portable consumer electronic product designer needs to utilize some power saving technologies to extend a standby time of portable consumer electronic products, where decreasing standby time power consumption is the most important power saving technology of the power saving technologies.

When a portable consumer electronic product is in a light lode mode or a standby time mode, an active feedback control integrated circuit, a switch of a primary side, and a photo coupler of an alternating current/direct current converter of the portable consumer electronic product still generate very large power loss. Because the portable consumer electronic product is in the light lode mode or the standby time mode for a long time, decreasing the power loss of the active feedback control integrated circuit, the switch of the primary side, and the photo coupler can significantly decrease standby time power consumption of the portable consumer electronic product.

For decreasing the standby time power consumption of the portable consumer electronic product, the prior art increases impedance of a COMP pin of the active feedback control integrated circuit to decrease operation current and a burst frequency of a pulse width modulation signal which is used for controlling turning-on and turning-off of the switch of the primary side of the active feedback control integrated circuit. However, when the portable consumer electronic product is in the standby time mode, the alternating current/direct current converter still operates in a close loop, so the power loss of the active feedback control integrated circuit, the switch of the primary side, and the photo coupler is higher than the power loss of the active feedback control integrated circuit, the switch of the primary side, and the photo coupler when the alternating current/direct current converter operates in an open loop, and the portable consumer electronic product has slower transient response.

SUMMARY OF THE INVENTION

An embodiment provides an active feedback control integrated circuit applied to an alternating current/direct current converter. The active feedback control integrated circuit includes a feedback pin, an operation unit, a control unit, and a controlled-current generation unit. The feedback pin is used for receiving a feedback current of an output feedback unit of the alternating current/direct current converter. The operation unit is coupled to the feedback pin for generating an operation signal according to the feedback current. The control unit is coupled to the operation unit for generating a current control signal. The controlled-current generation unit is coupled to the control unit for generating a controlled current to the feedback pin according to the current control signal.

Another embodiment provides an operation method of an active feedback control integrated circuit applied to an alternating current/direct current converter, where the active feedback control integrated circuit includes a feedback pin, an operation unit, a control unit, and a controlled-current generation unit, where the controlled-current generation unit includes a first current source, a first switch, a second switch, and a third switch. The operation method includes receiving an auxiliary voltage generated by the alternating current/direct current converter; the operation unit detecting a plurality of switch signals transmitted to a switch of a primary side of the alternating current/direct current converter and a feedback current of an output feedback unit of the alternating current/direct current converter to generate an operation signal; the control unit generating and outputting a current control signal according to the operation signal; and the controlled-current generation unit controlling turning-on and turning-off of the first switch, the second switch, and the third switch according to the current control signal.

Another embodiment provides an operation method of an active feedback control integrated circuit applied to an alternating current/direct current converter, where the active feedback control integrated circuit includes a feedback pin, an operation unit, a control unit, and a controlled-current generation unit. The operation method includes the feedback pin receiving a feedback current of an output feedback unit of the alternating current/direct current converter; the operation unit generating an operation signal according to the feedback current; the control unit generating a current control signal; and the controlled-current generation unit generating a controlled current to the feedback pin according to the current control signal.

The present invention provides an active feedback control integrated circuit applied to an alternating current/direct current converter and an operation method thereof. The active feedback control integrated circuit and the operation method utilize an operation unit to generate an operation signal according to a feedback current of a feedback pin of the active feedback control integrated circuit, utilize a control unit to generate a current control signal according to the operation signal, and utilize a controlled-current generation unit to generate a controlled current to the feedback pin according to the current control signal. Therefore, when the alternating current/direct current converter is in a burst mode, the present invention can make the alternating current/direct current converter enter a state similar to a deep sleep mode. In addition, the controlled-current generation unit can also generate a controlled current flowing through the feedback pin according to a corresponding current control signal to control the alternating current/direct current converter to enter or leave the deep sleep mode. Therefore, when the alternating current/direct current converter is in the burst mode or the deep sleep mode, the present invention has advantages as follows: first, the present invention can make the alternating current/direct current converter enter an open loop to decrease power loss of an output feedback unit; second, the present invention can extend switch signal intervals in the burst mode to decrease switch loss of a switch of a primary side of the alternating current/direct current converter; third, the present invention can utilize the controlled-current generation unit to decrease operation current of the active feedback control integrated circuit to decrease power loss of the active feedback control integrated circuit; and fourth, the present invention can present the alternating current/direct current converter from entering an audio frequency band to generate annoying noise.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
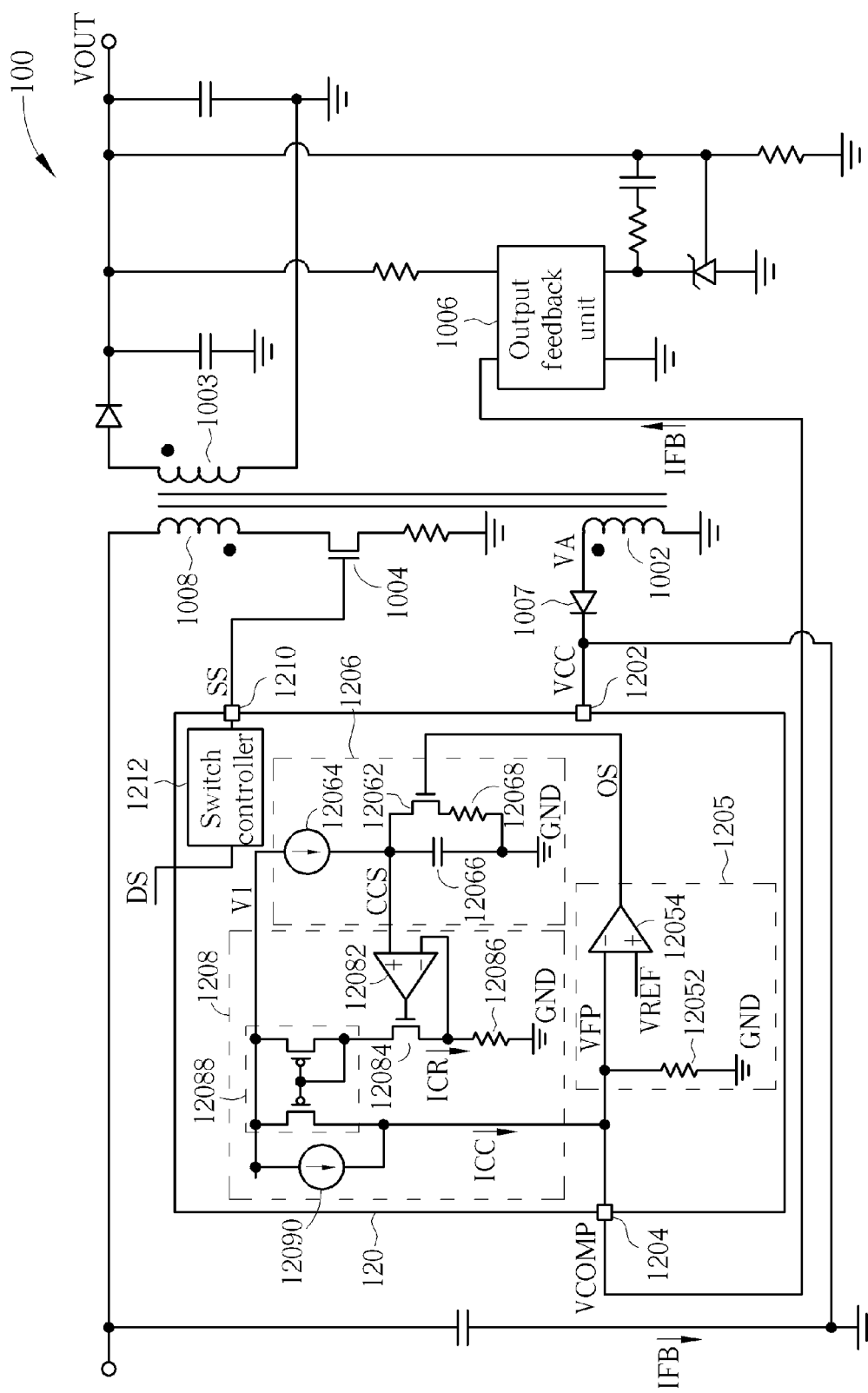
FIG. 1 is a diagram illustrating an active feedback control integrated circuit applied to an alternating current/direct current converter according to an embodiment.

Please refer to FIG. 1. FIG. 1 is a diagram illustrating an active feedback control integrated circuit 120 applied to an alternating current/direct current converter 100 according to an embodiment. As shown in FIG. 1, the active feedback control integrated circuit 120 includes a first pin 1202, a feedback pin 1204, an operation unit 1205, a control unit 1206, a controlled-current generation unit 1208, and a switch control pin 1210. The first pin 1202 is used for coupling to an auxiliary winding 1002 of a primary side of the alternating current/direct current converter 100, and receiving an auxiliary voltage VA generated by the auxiliary winding 1002, where polarity of the auxiliary winding 1002 is the same as polarity of a secondary side winding 1003 of the alternating current/direct current converter 100. But, in another embodiment of the present invention, the polarity of the auxiliary winding 1002 and the polarity of the secondary side winding 1003 of the alternating current/direct current converter 100 are opposite. In addition, the present invention is not limited to the auxiliary voltage VA being generated by the auxiliary winding 1002. That is to say, the auxiliary voltage VA can also be generated by a plurality of auxiliary windings, or by other devices of the primary side of the alternating current/direct current converter 100. The feedback pin 1204 is used for receiving a feedback current IFB of an output feedback unit 1006 (e.g. a photo coupler) of the alternating current/direct current converter 100. But, the present invention is not limited to the output feedback unit 1006 being a photo coupler. The operation unit 1205 is coupled to the feedback pin 1204 for generating an operation signal OS according to the feedback current IFB. The control unit 1206 is coupled to the operation unit 1205 for generating a current control signal CCS. The controlled-current generation unit 1208 is coupled to the control unit 1206 and the feedback pin 1204 for generating a controlled current ICC to the feedback pin 1204 according to the current control signal CCS.

As shown in FIG. 1, the operation unit 1205 includes a first resistor 12052 and a first operational amplifier 12054. The first resistor 12052 is used for generating a feedback pin voltage VFP according to the feedback current IFB and the controlled current ICC. The first operational amplifier 12054 is used for generating and outputting the operation signal OS according to the feedback pin voltage VFP and a reference voltage VREF. The control unit 1206 includes a switch 12062, a first current source 12064, a capacitor 12066, and a second resistor 12068. As shown in FIG. 1, the switch 12062 has a control terminal coupled to the first operational amplifier 12054 for being turned on and turned off according to the operation signal OS. The first current source 12064 coupled to a first voltage V1. The capacitor 12066 coupled between the first current source 12064 and ground GND. The second resistor 12068 coupled to between the switch 12062 and the ground GND. As shown in FIG. 1, when the switch 12062 is turned off, the control unit 1206 generates the current control signal CCS according to the first current source 12064 and the capacitor 12066; and when the switch 12062 is turned on, the control unit 1206 generates the current control signal CCS according to the first current source 12064, the capacitor 12066, and the second resistor 12068. The controlled-current generation unit 1208 includes a second operational amplifier 12082, a transistor 12084, a third resistor 12086, and a current mirror 12088. The second operational amplifier 12082 is coupled to the control unit 1206 for receiving the current control signal CCS. The transistor 12084 is coupled to the second operational amplifier 12082. The third resistor 12086 is coupled between the transistor 12084 and the ground GND, where the second operational amplifier 12082, the transistor 12084, and the third resistor 12086 are used for generating a controlled reference current ICR according to the current control signal CCS. The current mirror 12088 coupled to the transistor 12084 and a second current source 12090 for generating and outputting the controlled current ICC according to the controlled reference current ICR and a current provided by the second current source 12090.

Figure 2:
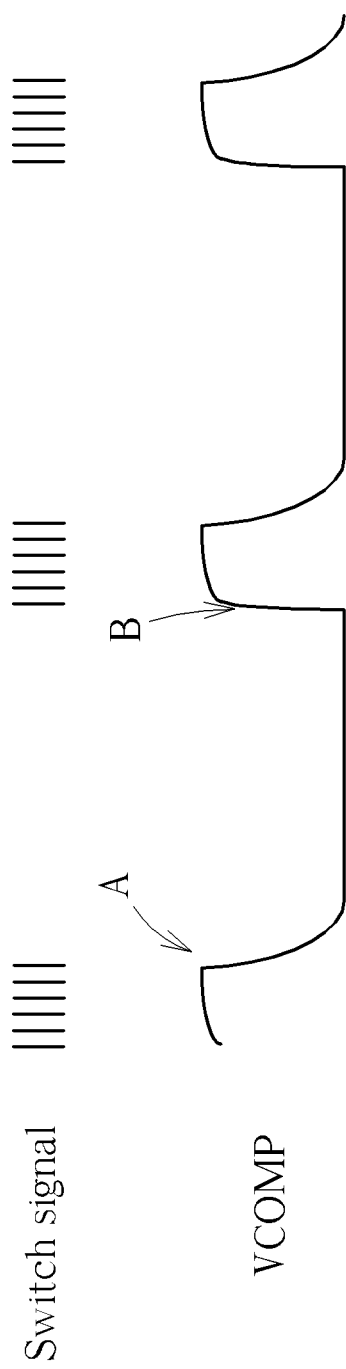
FIG. 2 is a diagram illustrating a voltage of the feedback pin when the alternating current/direct current converter is in a burst mode.

Please refer to FIG. 2. FIG. 2 is a diagram illustrating a voltage VCOMP of the feedback pin 1204 when the alternating current/direct current converter 100 is in a burst mode. As shown in FIG. 1 and FIG. 2, when the alternating current/direct current converter 100 is in the burst mode (that is, a light load mode or a normal mode) and a plurality of switch signals SS transmitted to a switch 1004 of the primary side of the alternating current/direct current converter 100 are be turned off, because the switch 1004 is turned off, no current flowing through a primary side winding 1008 and a second side winding 1003, resulting in the auxiliary voltage VA being gradually decreased (the detection voltage VCC is also gradually decreased) and an output voltage VOUT of the alternating current/direct current converter 100 being decreased, where the plurality of switch signals SS are generated by a switch controller 1212 according to a dimming signal DS, and the plurality of switch signals SS are outputted to the switch 1004 through the switch control pin 1210. Because the output voltage VOUT is decreased, the feedback current IFB of the output feedback unit 1006 is also decreased with decrease of the output voltage VOUT. As shown in FIG. 1, because the feedback current IFB is decreased, the feedback pin voltage VFP is decreased, resulting in the operation signal OS being increased. In the control unit 1206, because the operation signal OS is increased, the switch 12062 is turned on, resulting in the current control signal CCS generated according to the first current source 12064, the capacitor 12066, and the second resistor 12068 being decreased. In controlled-current generation unit 1208, because the current control signal CCS is decreased, the controlled reference current ICR generated according to the current control signal CCS and the third resistor 12086 is also decreased, resulting in the controlled current ICC generated according to the controlled reference current ICR and the current provided by the second current source 12090 being also decreased. Thus, because the controlled current ICC is decreased, the feedback current IFB becomes lower, resulting in the voltage VCOMP of the feedback pin 1204 being quickly decreased (an arrow A as shown in FIG. 2).

When the alternating current/direct current converter 100 is in the burst mode and the plurality of switch signals SS transmitted to the switch 1004 of the primary side of the alternating current/direct current converter 100 are turned on, the second side winding 1003 starts to store power because the switch 1004 is turned on, resulting in the output voltage VOUT being increased and the auxiliary voltage VA being also increased again because the auxiliary winding 1002 also senses variation of magnetic flux. Because the output voltage VOUT is increased, the feedback current IFB of the output feedback unit 1006 is also increased with increase of the output voltage VOUT. As shown in FIG. 1, because the feedback current IFB is increased, the feedback pin voltage VFP is increased, resulting in the operation signal OS being decreased. In the control unit 1206, because the operation signal OS is decreased, the switch 12062 is turned off, resulting in the current control signal CCS generated according to the first current source 12064 and the capacitor 12066 being increased. In the controlled-current generation unit 1208, because the current control signal CCS is increased, the controlled reference current ICR generated according to the current control signal CCS and the third resistor 12086 is also increased, resulting in the controlled current ICC generated according to the controlled reference current ICR and the current provided by the second current source 12090 being also increased. Thus, because the controlled current ICC is increased, the feedback current IFB becomes higher, resulting in the voltage VCOMP of the feedback pin 1204 being quickly increased (an arrow B as shown in FIG. 2). In addition, the auxiliary voltage VA is not less than a low predetermined voltage to prevent the active feedback control integrated circuit 120 from being shut down, where the low predetermined voltage is a minimum voltage for the active feedback control integrated circuit 120 operating normally.

Figure 3:
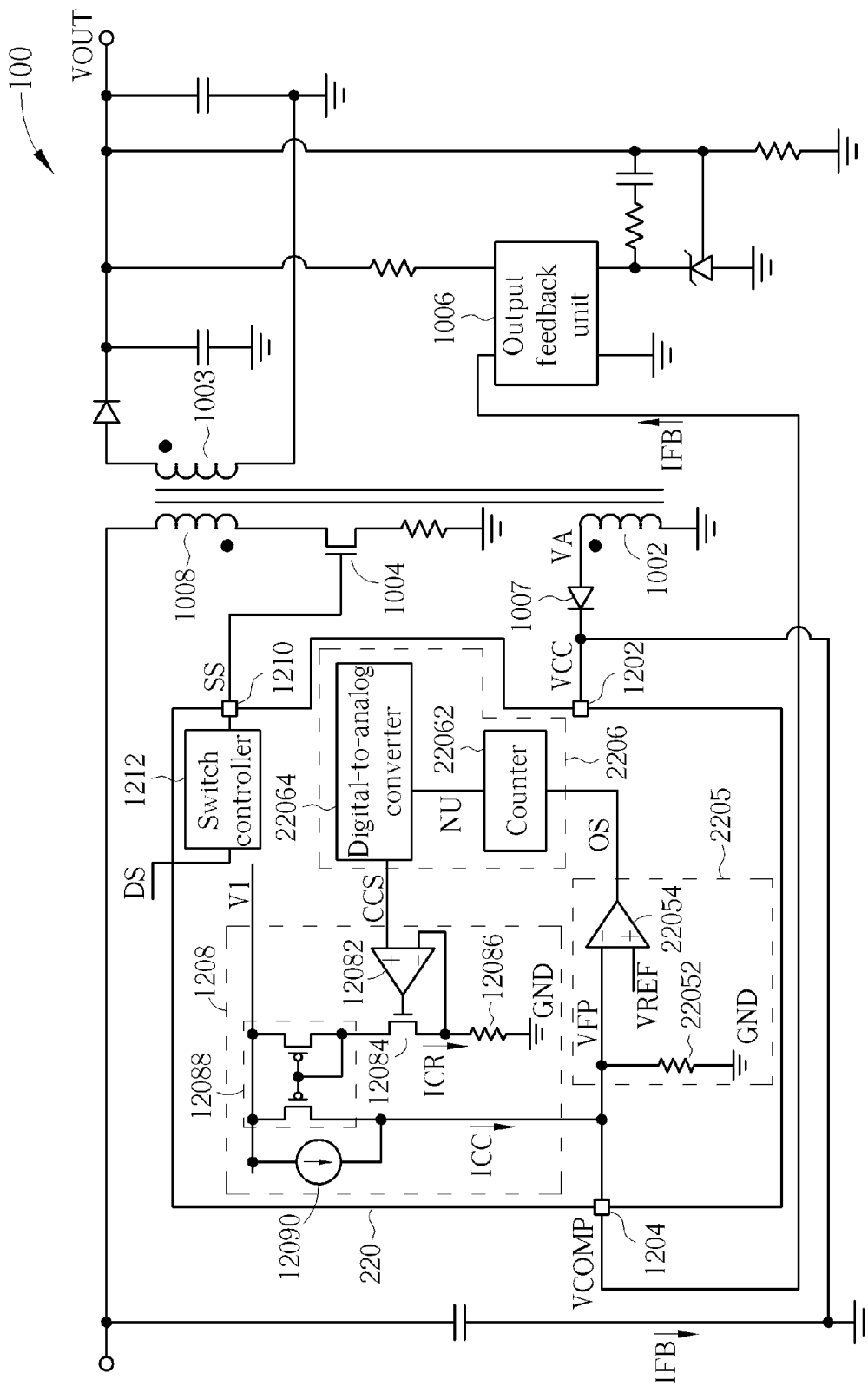
FIG. 3 is a diagram illustrating an active feedback control integrated circuit applied to the alternating current/direct current converter according to another embodiment.

Please refer to FIG. 3. FIG. 3 is a diagram illustrating an active feedback control integrated circuit 220 applied to the alternating current/direct current converter 100 according to another embodiment. As shown in FIG. 3, the active feedback control integrated circuit 220 includes a first pin 1202, a feedback pin 1204, an operation unit 2205, a control unit 2206, a controlled-current generation unit 1208, and a switch control pin 1210. As shown in FIG. 3, the operation unit 2205 includes a first resistor 22052 and a comparator 22054. The comparator 22054 is used for generating and outputting an operation signal OS according to a feedback pin voltage VFP and a reference voltage VREF. The control unit 2206 includes a counter 22062 and a digital-to-analog converter 22064. The counter 22062 is coupled to the comparator 22054 for increasingly counting or decreasingly counting according to the operation signal OS to generate a number NU. The digital-to-analog converter 22064 is coupled to the counter 22062 for converting the number NU into the current control signal CCS.

As shown in FIG. 2 and FIG. 3, when the alternating current/direct current converter 100 is in the burst mode and the plurality of switch signals SS transmitted to the switch 1004 of the primary side of the alternating current/direct current converter 100 are turned off, because an output voltage VOUT of the alternating current/direct current converter 100 is decreased, a feedback current IFB of the output feedback unit 1006 is also decreased with decrease of the output voltage VOUT. As shown in FIG. 3, in the operation unit 2205, because the feedback current IFB is decreased, the feedback pin voltage VFP is decreased, resulting in the operation signal OS being increased. In the control unit 2206, the counter 22062 decreasingly counts according to increase of the operation signal OS because the operation signal OS is increased. That is to say, the number NU is decreased, resulting in the current control signal CCS generated by the digital-to-analog converter 22064 converting the number NU being decreased. Therefore, a controlled current ICC is decreased, so the feedback current IFB becomes lower, resulting in a voltage VCOMP of the feedback pin 1204 is quickly decreased (the arrow A as shown in FIG. 2).

As shown in FIG. 2 and FIG. 3, when the alternating current/direct current converter 100 is in the burst mode and the plurality of switch signals SS transmitted to the switch 1004 of the primary side of the alternating current/direct current converter 100 are turned on, because the output voltage VOUT is increased, the feedback current IFB of the output feedback unit 1006 is also increased with increase of the output voltage VOUT. As shown in FIG. 3, in the operation unit 2205, because the feedback current IFB is increased, the feedback pin voltage VFP is increased, resulting in the operation signal OS being decreased. In the control unit 2206, the counter 22062 increasingly counts according to decrease of the operation signal OS because the operation signal OS is decreased. That is to say, the number NU is increased, resulting in the current control signal CCS generated by the digital-to-analog converter 22064 converting the number NU being increased. Therefore, the controlled current ICC is increased, so the feedback current IFB becomes higher, resulting in the voltage VCOMP of the feedback pin 1204 is quickly increased (the arrow B as shown in FIG. 2).

Figure 4:
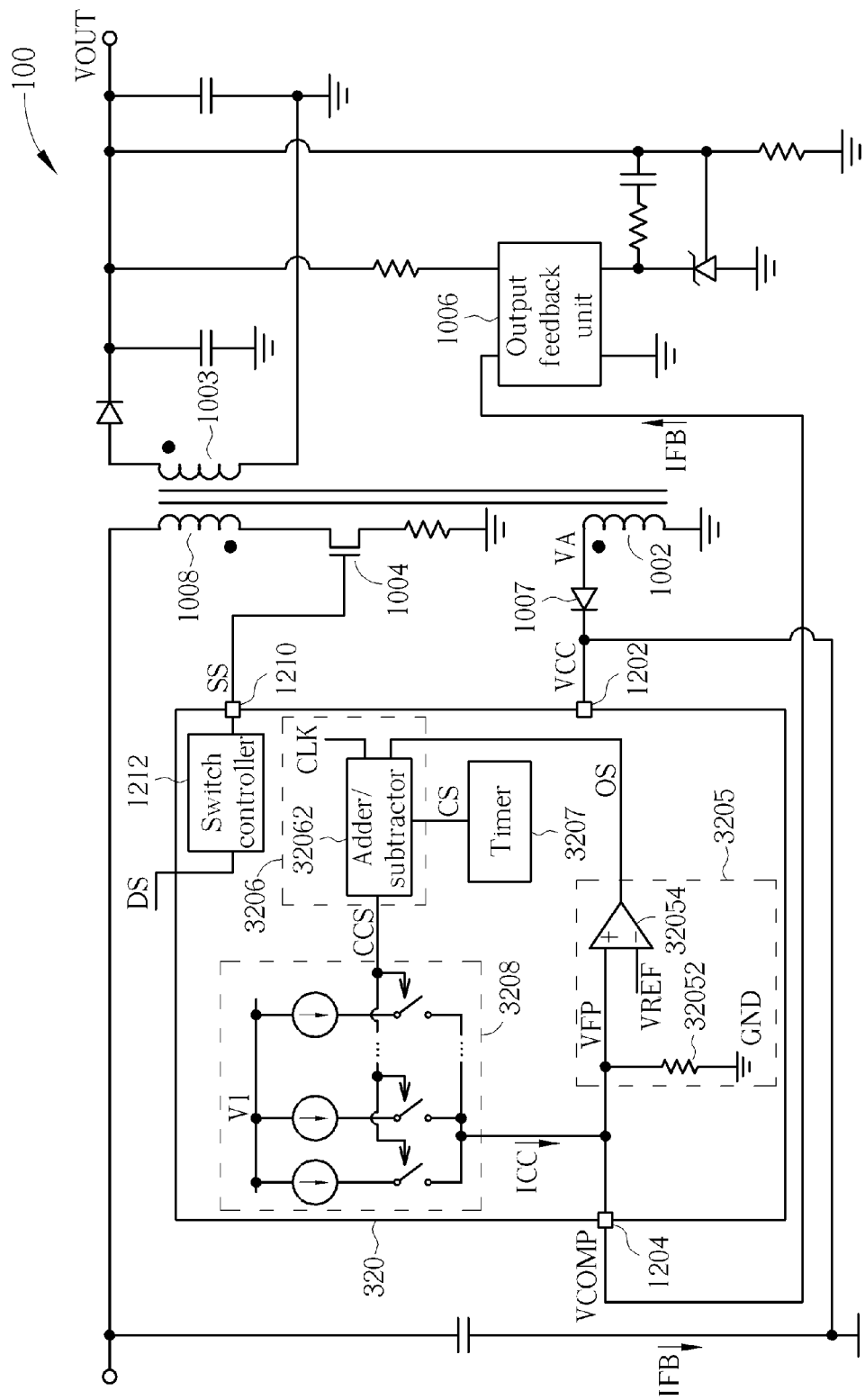
FIG. 4 is a diagram illustrating an active feedback control integrated circuit applied to the alternating current/direct current converter according to another embodiment.

Please refer to FIG. 4. FIG. 4 is a diagram illustrating an active feedback control integrated circuit 320 applied to the alternating current/direct current converter 100 according to another embodiment. As shown in FIG. 4, the active feedback control integrated circuit 220 includes a first pin 1202, a feedback pin 1204, an operation unit 3205, a control unit 3206, a controlled-current generation unit 3208, and a switch control pin 1210. The operation unit 3205 includes a first resistor 32052 and an analog-to-digital converter 32054. The analog-to-digital converter 32054 is used for generating and outputting an operation signal OS according to a feedback pin voltage VFP and a reference voltage VREF, where the operation signal OS is an N-bit signal and N is a positive integer. The control unit 3206 includes an adder/subtractor 32062. The adder/subtractor 32062 is coupled to the analog-to-digital converter 32054 for generating the current control signal CCS according to the operation signal OS and a control signal CS, where the current control signal CCS is also an N-bit signal and the control signal CS is generated by a timer 3207. That is to say, the timer 3207 can generate the control signal CS to the adder/subtractor 32062 for each fixed time. But, in another embodiment of the present invention, the control signal CS is generated by a primary side circuit of the alternating current/direct current converter 100. For example, the control signal CS can be a detection voltage VCC, where the detection voltage VCC is equal to an auxiliary voltage VA minus a voltage drop of a diode 1007 (as shown in FIG. 4). The controlled-current generation unit 3208 includes N switches and N current sources, where each current source of the N current sources corresponds to a switch of the N switches, and N switches is used for being turned-on and turned-off according to the current control signal CCS.

As shown in FIG. 2 and FIG. 4, when the alternating current/direct current converter 100 is in the burst mode and the plurality of switch signals SS transmitted to the switch 1004 of the primary side of the alternating current/direct current converter 100 are turned off, because an output voltage VOUT is decreased, a feedback current IFB of the output feedback unit 1006 is also decreased with decrease of the output voltage VOUT. As shown in FIG. 4, in the operation unit 3205, the feedback pin voltage VFP is decreased because the feedback current IFB is decreased, resulting in the operation signal OS being decreased. In the control unit 3206, because the operation signal OS is decreased, the current control signal CCS generated by the adder/subtractor 32062 according to a clock CLK and decrease of the operation signal OS is also decreased. Thus, a controlled current ICC generated by the controlled-current generation unit 3208 is decreased (because the controlled-current generation unit 3208 turns off more switches of the N switches according to decrease of the current control signal CCS), so the feedback current IFB becomes lower, resulting in a voltage VCOMP of the feedback pin 1204 is quickly decreased (the arrow A as shown in FIG. 2).

As shown in FIG. 2 and FIG. 4, when the alternating current/direct current converter 100 is in the burst mode and the plurality of switch signals SS transmitted to the switch 1004 of the primary side of the alternating current/direct current converter 100 are turned on, because the output voltage VOUT is increased, the feedback current IFB of the output feedback unit 1006 is also increased with increase of the output voltage VOUT. As shown in FIG. 4, in the operation unit 3205, because the feedback current IFB is increased, the feedback pin voltage VFP is increased, resulting in the operation signal OS being increased. In the control unit 3206, because the operation signal OS is increased, the current control signal CCS generated by the adder/subtractor 32062 according to the clock CLK and increase of the operation signal OS is also increased. Thus, the controlled current ICC generated by the controlled-current generation unit 3208 is increased (because the controlled-current generation unit 3208 turns off less switches of the N switches according to increase of the current control signal CCS), so the feedback current IFB becomes higher, resulting in the voltage VCOMP of the feedback pin 1204 is quickly increased (the arrow B as shown in FIG. 2).

Figure 5:
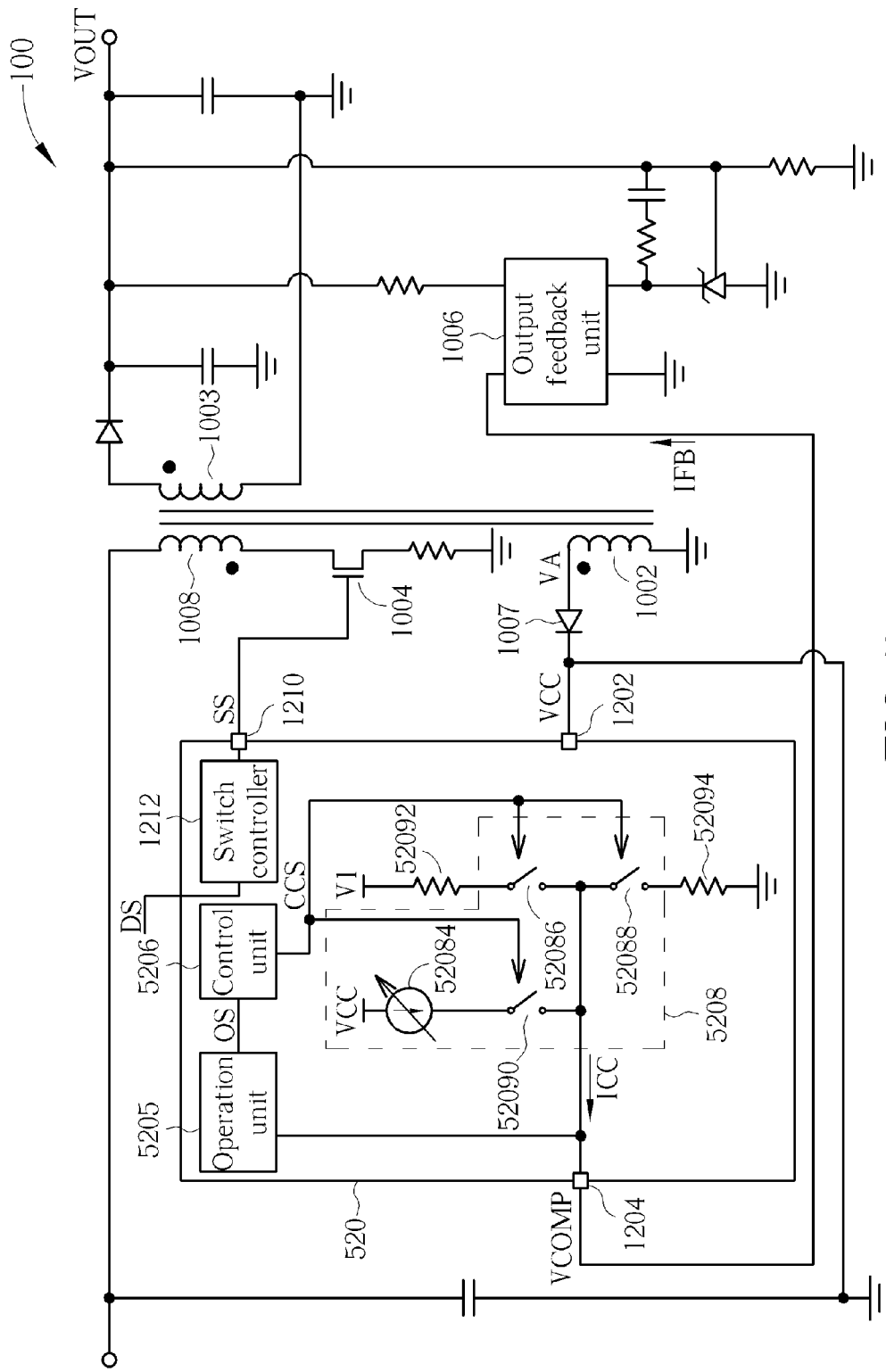
FIG. 5 is a diagram illustrating an active feedback control integrated circuit applied to the alternating current/direct current converter according to another embodiment.

Please refer to FIG. 5. FIG. 5 is a diagram illustrating an active feedback control integrated circuit 520 applied to the alternating current/direct current converter 100 according to another embodiment. As shown in FIG. 5, the active feedback control integrated circuit 520 includes a first pin 1202, a feedback pin 1204, an operation unit 5205, a control unit 5206, a controlled-current generation unit 5208, and a switch control pin 1210. The operation unit 5205 is coupled to the feedback pin 1204 for generating an operation signal OS to the control unit 5206 according to a feedback current IFB and a plurality of switch signals SS transmitted to the switch 1004 of the primary side of the alternating current/direct current converter 100. The control unit 5206 is coupled to the operation unit 5205 for generating the current control signal CCS according to the operation signal OS. The controlled-current generation unit 5208 is coupled to the control unit 5206 and the feedback pin 1204 for generating a controlled current ICC to the feedback pin 1204 according to the current control signal CCS.

As shown in FIG. 5, the controlled-current generation unit 5208 includes a first current source 52084, a first switch 52086, a second switch 52088, and a third switch 52090, where the first current source 52084 is a variable current source. That is to say, a current provided by the first current source 52084 is changed according to a detection voltage VCC. In addition, the current provided by the first current source 52084 is also changed according to an auxiliary voltage VA (because the detection voltage VCC is equal to the auxiliary voltage VA minus a voltage drop of the diode 1007). As shown in FIG. 5, the first switch 52086 is coupled to a first resistor 52092; the second switch 52088 is coupled to a second resistor 52094, the first switch 52086, and the feedback pin 1204; and the third switch 52090 is coupled to the first current source 52084, the first switch 52086, the second switch 52088, and the feedback pin 1204.

Figure 6:
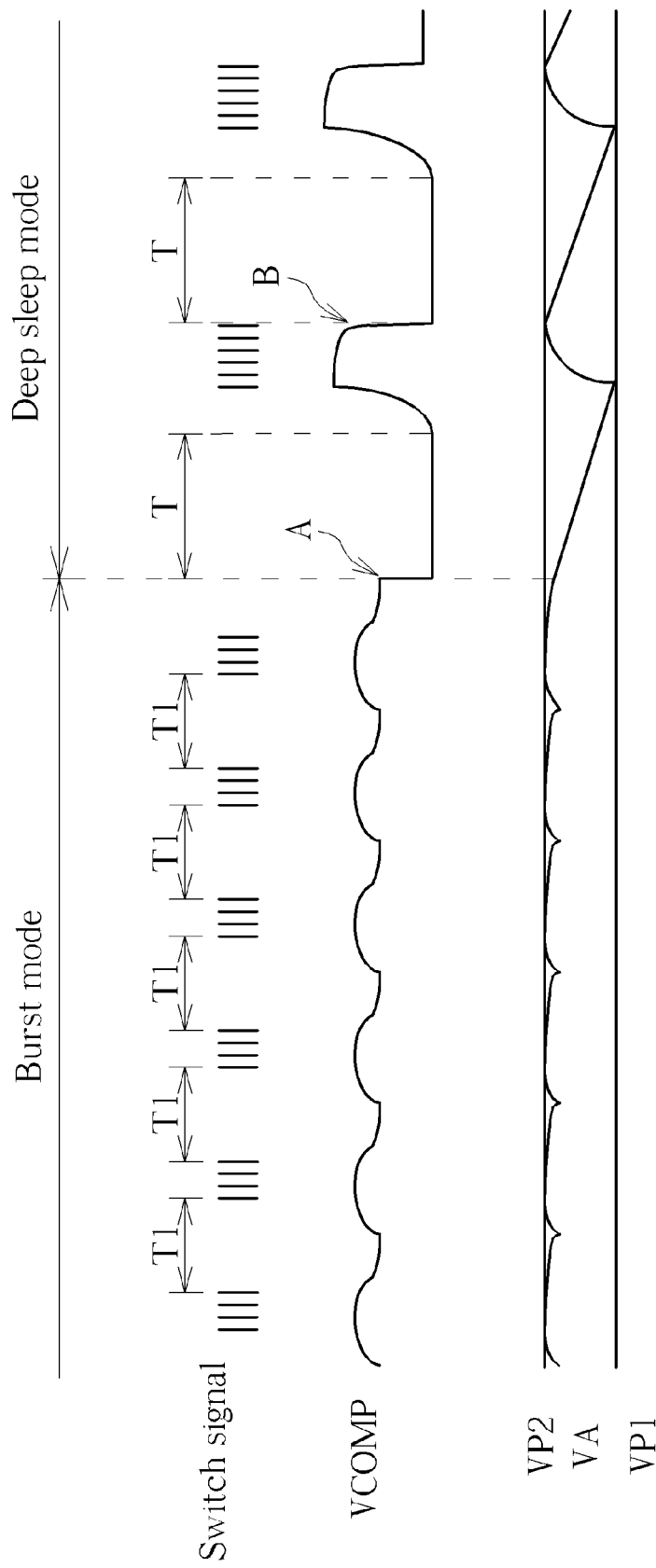
FIG. 6 and FIG. 7 are diagrams illustrating a voltage of the feedback pin and the auxiliary voltage when the alternating current/direct current converter is in the burst mode and a deep sleep mode.
Figure 7:
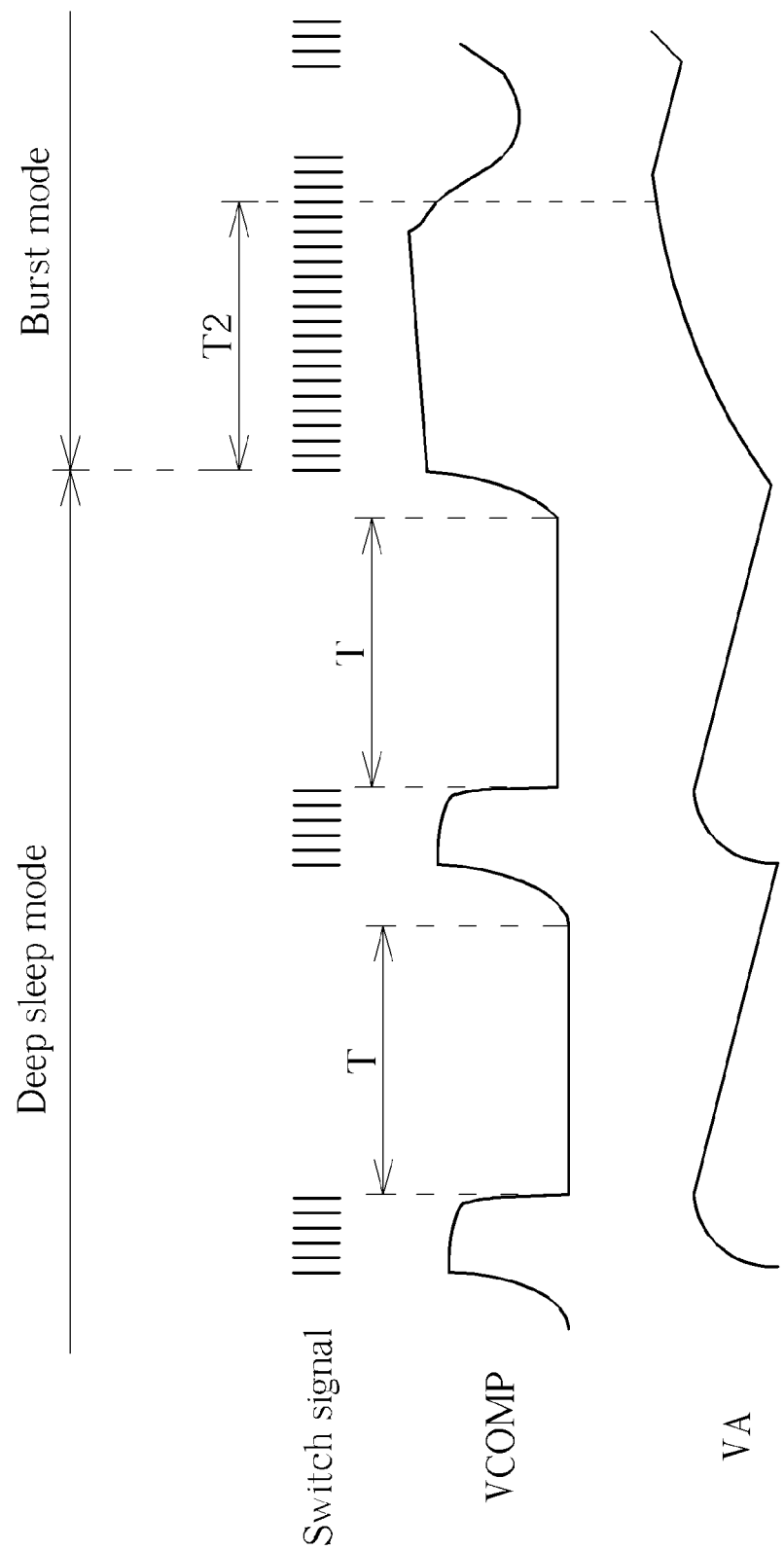

Please refer to FIG. 6 and FIG. 7. FIG. 6 and FIG. 7 are diagrams illustrating a voltage VCOMP of the feedback pin 1204 and the auxiliary voltage VA when the alternating current/direct current converter 100 is in the burst mode and a deep sleep mode. As shown in FIG. 6, when the alternating current/direct current converter 100 is in the burst mode and consecutive first predetermined number (e.g. 5) switch signal intervals (T1) are greater than a first predetermined time (e.g. 20 ms), the control unit 5206 generates the current control signal CCS (corresponding to the alternating current/direct current converter 100 being in the burst mode and consecutive first predetermined number (e.g. 5) switch signal intervals (T1) being greater than a first predetermined time (e.g. 20 ms)). But, the present invention is not limited to the first predetermined number being 5 and the first predetermined time being 20 ms.

Figure 8:
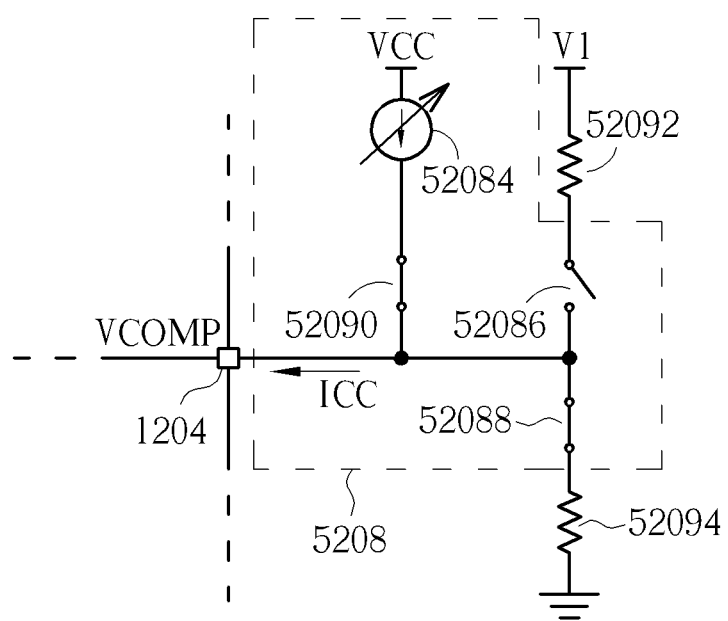
FIG. 8 is a diagram illustrating the feedback current flowing through the feedback pin when the first switch is turned off according to the current control signal and the second switch and the third switch are turned on according to the current control signal.

Please refer to FIG. 8. FIG. 8 is a diagram illustrating the feedback current IFB flowing through the feedback pin 1204 when the first switch 52086 is turned off according to the current control signal CCS (corresponding to the alternating current/direct current converter 100 being in the burst mode and consecutive first predetermined number switch signal intervals (T1) being greater than the first predetermined time) and the second switch 52088 and the third switch 52090 are turned on according to the current control signal CCS (corresponding to the alternating current/direct current converter 100 being in the burst mode and consecutive first predetermined number switch signal intervals (T1) being greater than the first predetermined time). As shown in FIG. 8, the first switch 52086 is turned off according to the current control signal CCS (corresponding to the alternating current/direct current converter 100 being in the burst mode and consecutive first predetermined number switch signal intervals (T1) being greater than the first predetermined time and the second switch 52088 and the third switch 52090 are turned on according to the current control signal CCS (corresponding to the alternating current/direct current converter 100 being in the burst mode and consecutive first predetermined number switch signal intervals (T1) being greater than the first predetermined time), where the controlled current ICC flowing through the feedback pin 1204 is determined by the current provided by the first current source 52084. That is to say, the controlled-current generation unit 5208 generates the controlled current ICC flowing through the feedback pin 1204 according to the corresponding current control signal (the first current control signal) current control signal CCS (corresponding to the alternating current/direct current converter 100 being in the burst mode and consecutive first predetermined number switch signal intervals (T1) being greater than the first predetermined time). Because the controlled current ICC flowing through the feedback pin 1204 is instantly decreased, the voltage VCOMP of the feedback pin 1204 is also decreased instantly (an arrow A as shown in FIG. 6).

Meanwhile, because the feedback current IFB can not drive the output feedback unit 1006, the alternating current/direct current converter 100 enters an open loop. That is to say, when the consecutive first predetermined number switch signal intervals (T1) in the burst mode are greater than the first predetermined time, the control unit 5206 determines that the alternating current/direct current converter 100 enters the deep sleep mode, so the control unit 5206 generates the current control signal CCS (corresponding to the alternating current/direct current converter 100 being in the burst mode and consecutive first predetermined number switch signal intervals (T1) being greater than the first predetermined time) to turn off the first switch 52086 and turn on the second switch 52088 and the third switch 52090, resulting in the alternating current/direct current converter 100 entering the open loop.

In addition, as shown in FIG. 6, after the alternating current/direct current converter 100 enters the deep sleep mode, because the switch 1004 is turned off, no current follows through the primary side winding 1008, resulting in the auxiliary voltage VA being gradually decreased (the detection voltage VCC is also gradually decreased). After the auxiliary voltage VA is decreased for a predetermined time T, the current provided by the first current source 52084 starts to be increased, resulting in the voltage VCOMP of the feedback pin 1204 being increased (because the controlled current ICC flowing through the feedback pin 1204 is increased). Meanwhile, the active feedback control integrated circuit 520 can increase a voltage of the switch control pin 1210 according to the voltage VCOMP of the feedback pin 1204 until the switch 1004 of the primary side is turned on, resulting in the output voltage VOUT of the secondary side of the alternating current/direct current converter 100 being increased again and the auxiliary voltage VA being also increased again. That is to say, because the switch 1004 is turned on, the second side winding 1003 starts to store power, resulting in the output voltage VOUT being increased and the auxiliary voltage VA being also increased again because the auxiliary winding 1002 also senses variation of magnetic flux. Thus, the auxiliary voltage VA is not less than a low predetermined voltage VP1 to prevent the active feedback control integrated circuit 520 from being shut down, where the low predetermined voltage VP1 is a minimum voltage for the active feedback control integrated circuit 520 operating normally.

In another embodiment of the present invention, when the auxiliary voltage VA is greater than a high predetermined voltage VP2, the current provided by the first current source 52084 is decreased to zero, so the voltage VCOMP of the feedback pin 1204 is quickly decreased (an arrow B as shown in FIG. 6). Meanwhile, the voltage of the switch control pin 1210 is also quickly decreased, resulting in the switch 1004 of the primary side of the alternating current/direct current converter 100 being turned off again. Thus, power loss of the switch 1004 can be decreased. Because the switch 1004 is turned off, the second side winding 1003 does not store power, resulting in the output voltage VOUT being gradually decreased and the auxiliary voltage VA being also gradually decreased again because the auxiliary winding 1002 also senses variation of magnetic flux.

As shown in FIG. 7, after the alternating current/direct current converter 100 enters the deep sleep mode (that is, after the first switch 52086 is turned off according to the current control signal CCS (corresponding to the alternating current/direct current converter 100 being in the burst mode and consecutive first predetermined number switch signal intervals (T1) being greater than the first predetermined time) and the second switch 52088 and the third switch 52090 are turned on according to the current control signal CCS (corresponding to the alternating current/direct current converter 100 being in the burst mode and consecutive first predetermined number switch signal intervals (T1) being greater than the first predetermined time)), a second predetermined time T2 after the switch 1004 of the primary side of the alternating current/direct current converter 100 is turned on includes a second predetermined number (e.g. 100) switch signals, the control unit 5206 generates the current control signal CCS (corresponding to the second predetermined time T2 including the second predetermined number (e.g. 100) switch signals after the switch 1004 is turned on).

Figure 9:
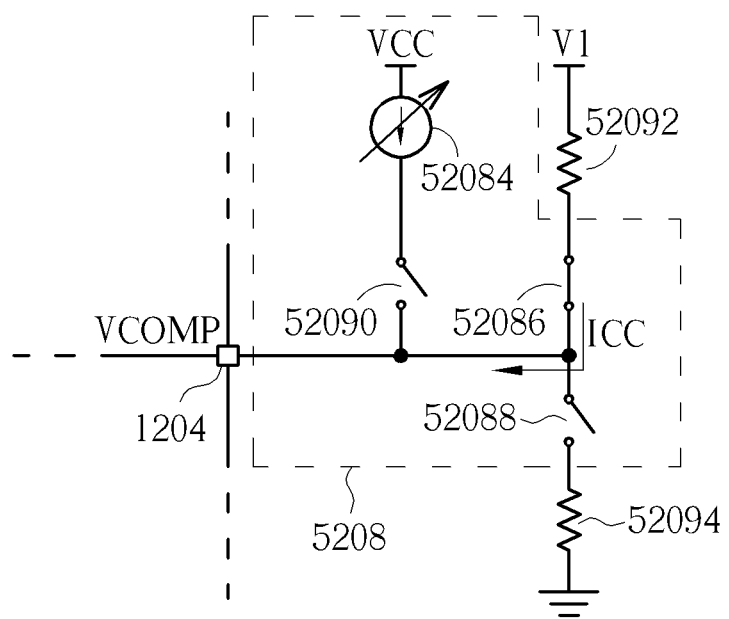
FIG. 9 is a diagram illustrating the feedback current flowing through the feedback pin when the first switch is turned on according to the current control signal and the second switch and the third switch are turned off according to the current control signal.

Please refer to FIG. 9. FIG. 9 is a diagram illustrating the feedback current IFB flowing through the feedback pin 1204 when the first switch 52086 is turned on according to the current control signal CCS (corresponding to the second predetermined time T2 including the second predetermined number (e.g. 100) switch signals after the switch 1004 is turned on) and the second switch 52088 and the third switch 52090 are turned off according to the current control signal CCS (corresponding to the second predetermined time T2 including the second predetermined number (e.g. 100) switch signals after the switch 1004 is turned on). As shown in FIG. 9, the first switch 52086 is turned on according to the current control signal CCS (corresponding to the second predetermined time T2 including the second predetermined number (e.g. 100) switch signals after the switch 1004 is turned on) and the second switch 52088 and the third switch 52090 are turned off according to the current control signal CCS (corresponding to the second predetermined time T2 including the second predetermined number (e.g. 100) switch signals after the switch 1004 is turned on), where the controlled current ICC flowing through the feedback pin 1204 is determined by a resistance of the first resistor 52092 (e.g. 5KΩ) and a first voltage V1 (e.g. 5V) received by the first resistor 52092, and the first voltage V1 is generated according to a bandgap reference voltage generated by the controlled-current generation unit 5208. That is to say, the controlled-current generation unit 5208 generates the controlled current ICC flowing through the feedback pin 1204 according to the current control signal CCS (corresponding to the second predetermined time T2 including the second predetermined number (e.g. 100) switch signals after the switch 1004 is turned on). But, the present invention is not limited to the resistance of the first resistor 52092 being 5KΩ and the first voltage V1 being 5V.

Meanwhile, because the feedback current IFB can drive the output feedback unit 1006, the alternating current/direct current converter 100 enters a close loop from the open loop. That is to say, when the second predetermined time T2 includes the second predetermined number switch signals, the operation unit 5205 determines that the alternating current/direct current converter 100 leaves the deep sleep mode to enter the burst mode, so the operation signal OS generated by the operation unit 5205 controls the control unit 5206 to generate the current control signal CCS (corresponding to the second predetermined time T2 including the second predetermined number (e.g. 100) switch signals after the switch 1004 is turned on to turn on the first switch 52086 and turn off the second switch 52088 and the third switch 52090, resulting in the alternating current/direct current converter 100 entering the close loop from the open loop.

Figure 10A:
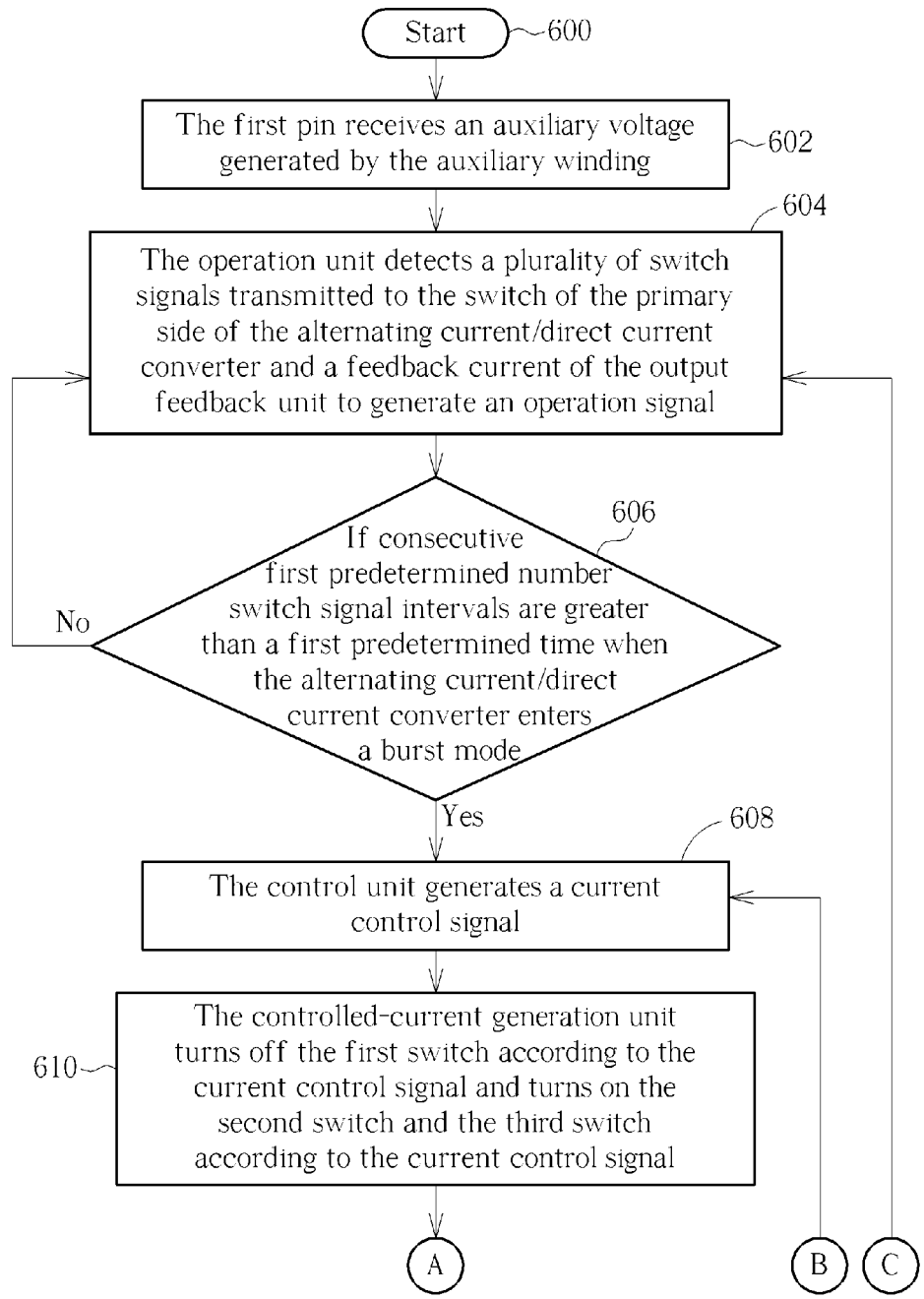
FIG. 10A and FIG. 10B are flowcharts illustrating an operation method of an active feedback control integrated circuit applied to an alternating current/direct current converter according to another embodiment.
Figure 10B:
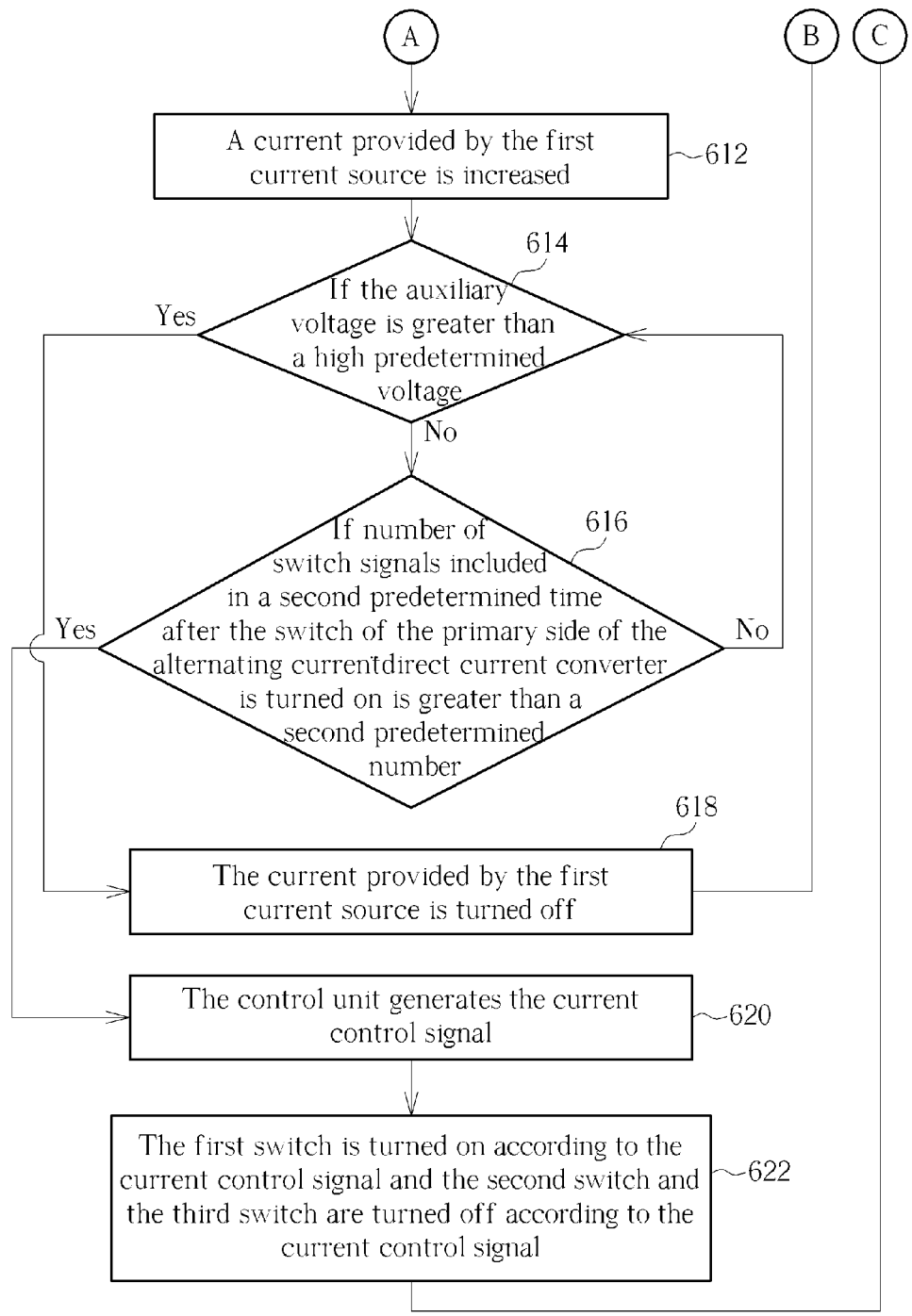

Please refer to FIG. 5, FIG. 6, FIG. 7, FIG. 8, FIG. 9, FIG. 10A, and FIG. 10B. FIG. 10A and FIG. 10B are flowcharts illustrating an operation method of an active feedback control integrated circuit applied to an alternating current/direct current converter according to another embodiment. The operation method in FIG. 10A and FIG. 10B are illustrated using the active feedback control integrated circuit 520 in FIG. 5. Detailed steps are as follows:

Step 600: Start.

Step 602: The first pin 1202 receives an auxiliary voltage VA generated by the auxiliary winding 1002.

Step 604: The operation unit 5205 detects a plurality of switch signals SS transmitted to the switch 1004 of the primary side of the alternating current/direct current converter 100 and a feedback current IFB of the output feedback unit 1006 to generate an operation signal OS.

Step 606: If consecutive first predetermined number switch signal intervals are greater than a first predetermined time when the alternating current/direct current converter 100 enters a burst mode; if yes, go to Step 608; if no, go to Step 604.

Step 608: The control unit 5206 generates the current control signal CCS.

Step 610: The controlled-current generation unit 5208 turns off the first switch 52086 according to the current control signal CCS and turns on the second switch 52088 and the third switch 52090 according to the current control signal CCS.

Step 612: A current provided by the first current source 52084 is increased.

Step 614: If the auxiliary voltage VA is greater than a high predetermined voltage VP2; if no, go to Step 616; if yes, go to Step 618.

Step 616: If number of the plurality of switch signals SS included in a second predetermined time T2 after the switch 1004 of the primary side of the alternating current/direct current converter 100 is turned on is greater than a second predetermined number; if no, go to Step 614; if yes, go to Step 620.

Step 618: The current provided by the first current source 52084 is turned off, go to Step 608.

Step 620: The control unit 5206 generates the current control signal CCS.

Step 622: The first switch 52086 is turned on according to the current control signal CCS and the second switch 52088 and the third switch 52090 are turned off according to the current control signal CCS, go to Step 604.

In Step 610, because the first switch 52086 is turned off and the second switch 52088 and the third switch 12090 are turned on, the controlled current ICC flowing through the feedback pin 1204 (as shown in FIG. 8) is determined by the current provided by the first current source 52084. Therefore, the alternating current/direct current converter 100 enters the open loop, and a voltage VCOMP of the feedback pin 1204 is instantly decreased (the arrow A as shown in FIG. 6). In addition, after the alternating current/direct current converter 100 enters the deep sleep mode, no current flows through the primary side winding 1008 because the switch 1004 is turned off, resulting in the auxiliary voltage VA being gradually decreased (the detection voltage VCC is also gradually decreased). In Step 612, after the auxiliary voltage VA is decreased for a predetermined time T, the current provided by the first current source 52084 starts to be increased, resulting in the voltage VCOMP of the feedback pin 1204 being increased. In Step 614, the active feedback control integrated circuit 520 can increase a voltage of the switch control pin 1210 according to the voltage VCOMP of the feedback pin 1204 until the switch 1004 of the primary side of the alternating current/direct current converter 100 is turned on, resulting in an output voltage VOUT of the secondary side of the alternating current/direct current converter 100 being increased again and the auxiliary voltage VA being also increased again. Thus, the auxiliary voltage VA is not less than the low predetermined voltage VP1 to prevent the active feedback control integrated circuit 520 from being shut down. In Step 618, as shown in FIG. 5, when the auxiliary voltage VA is greater than the high predetermined voltage VP2, the current provided by the first current source 52084 is decreased to zero, so the voltage VCOMP of the feedback pin 1204 is quickly decreased (the arrow B as shown in FIG. 6). Meanwhile, the voltage of the switch control pin 1210 is also quickly decreased, resulting in the switch 1004 of the primary side of the alternating current/direct current converter 100 being turned off again. Thus, power loss of the switch 1004 can be decreased. Because the switch 1004 is turned off, the second side winding 1003 does not store power, resulting in the output voltage VOUT being gradually decreased and the auxiliary voltage VA being also gradually decreased again because the auxiliary winding 1002 also senses variation of magnetic flux. In Step 620, when the second predetermined time T2 after the switch 1004 of the primary side of the alternating current/direct current converter 100 is turned on includes the second predetermined number switch signals, the control unit 5206 generates the current control signal CCS (corresponding to the second predetermined time T2 including the second predetermined number (e.g. 100) switch signals after the switch 1004 is turned on). Then, in Step 622, the first switch 52086 is turned on according to the current control signal CCS (corresponding to the second predetermined time T2 including the second predetermined number (e.g. 100) switch signals after the switch 1004 is turned on) and the second switch 52088 and the third switch 52090 are turned off according to the current control signal CCS (corresponding to the second predetermined time T2 including the second predetermined number (e.g. 100) switch signals after the switch 1004 is turned on). Therefore, the controlled current ICC flowing through the feedback pin 1204 (as shown in FIG. 9) is determined by the first resistor 52092 and a first voltage V1 received by the first resistor 52092. Meanwhile, because the current flowing through the feedback pin 1204 can drive the output feedback unit 1006, the alternating current/direct current converter 100 enters the close loop from the open loop. That is to say, when the second predetermined time T2 includes the second predetermined number switch signals, the operation unit 5205 determines that the alternating current/direct current converter 100 leaves the deep sleep mode to enter the burst mode, so the operation signal OS generated by the operation unit 5205 controls the control unit 5206 to generate the current control signal CCS (corresponding to the second predetermined time T2 including the second predetermined number (e.g. 100) switch signals after the switch 1004 is turned on to turn on the first switch 52086 and turn off the second switch 52088 and the third switch 52090, resulting in the alternating current/direct current converter 100 entering the close loop from the open loop.

Figure 11:
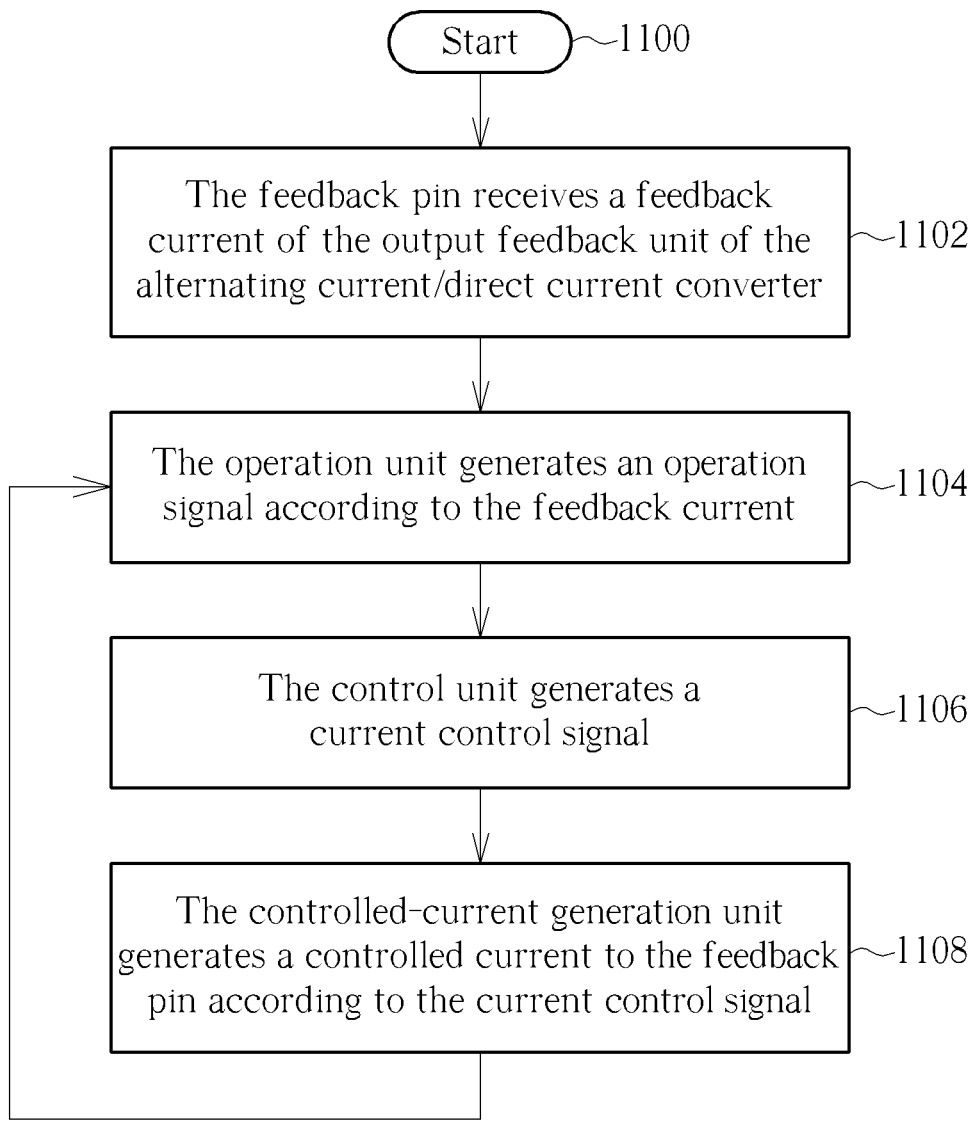
FIG. 11 is a flowchart illustrating an operation method of an active feedback control integrated circuit applied to an alternating current/direct current converter according to another embodiment.

Please refer to FIG. 1, FIG. 2, FIG. 3, FIG. 4, and FIG. 11. FIG. 11 is a flowchart illustrating an operation method of an active feedback control integrated circuit applied to an alternating current/direct current converter according to another embodiment. The operation method in FIG. 11 is illustrated using the active feedback control integrated circuit 120 in FIG. 1, the active feedback control integrated circuit 220 in FIG. 3, and the active feedback control integrated circuit 320 in FIG. 4. Detailed steps are as follows:

Step 1100: Start.

Step 1102: The feedback pin 1204 receives a feedback current IFB of the output feedback unit 1006 of the alternating current/direct current converter 100.

Step 1104: The operation unit generates an operation signal OS according to the feedback current IFB.

Step 1106: The control unit generates the current control signal CCS.

Step 1108: The controlled-current generation unit generates a controlled current ICC to the feedback pin 1204 according to the current control signal CCS, go to Step 1104.

Take the active feedback control integrated circuit 120 in FIG. 1 as an example. In Step 1104, the first resistor 12052 of the operation unit 1205 generates a feedback pin voltage VFP according to the feedback current IFB and the controlled current ICC. Then, the first operational amplifier 12054 of the operation unit 1205 generates and outputs the operation signal OS according to the feedback pin voltage VFP and the reference voltage VREF. In Step 1106, when the switch 12062 is turned off, the control unit 1206 generates the current control signal CCS according to the first current source 12064 and the capacitor 12066; and when the switch 12062 is turned on, the control unit 1206 generates the current control signal CCS according to the first current source 12064, the capacitor 12066, and the second resistor 12068. In Step 1108, the second operational amplifier 12082, the transistor 12084, and the third resistor 12086 generates the controlled reference current ICR according to the current control signal CCS. Then, the current mirror 12088 generate and outputs the controlled current ICC to the feedback pin 1204 according to the controlled reference current ICR and the current provided by the second current source 12090.

Take the active feedback control integrated circuit 220 in FIG. 3 as an example. In Step 1104, the comparator 22054 of the operation unit 2205 generates and outputs the operation signal OS according to the feedback pin voltage VFP and the reference voltage VREF. In Step 1106, the counter 22062 is used for increasingly counting or decreasingly counting according to the operation signal OS to generate the number NU. Then, the digital-to-analog converter 22064 converts the number NU into the current control signal CCS. In Step 1108, the second operational amplifier 12082, the transistor 12084, and the third resistor 12086 generates the controlled reference current ICR according to the current control signal CCS. Then, the current mirror 12088 generates and outputs the controlled current ICC to the feedback pin 1204 according to the controlled reference current ICR and the current provided by the second current source 12090.

Take the active feedback control integrated circuit 320 in FIG. 4 as an example. In Step 1104, the analog-to-digital converter 32054 generates and outputs the operation signal OS according to the feedback pin voltage VFP and the reference voltage VREF, where the operation signal OS is an N-bit signal. In Step 1106, the adder/subtractor 32062 of the control unit 3206 generates the current control signal CCS according to the operation signal OS and the control signal CS, where the current control signal CCS is also an N-bit signal, and the control signal CS is generated by the timer 3207 or equal to the detection voltage VCC. In Step 1108, the N switches and the N current sources of the controlled-current generation unit 3208 can generate and output the controlled current ICC to the feedback pin 1204 according to the current control signal CCS.

To sum up, the active feedback control integrated circuit applied to an alternating current/direct current converter and the operation method thereof utilize the operation unit to generate an operation signal according to a feedback current of the feedback pin of the active feedback control integrated circuit, utilize the control unit to generate the current control signal according to the operation signal, and utilize the controlled-current generation unit to generate a controlled current to the feedback pin according to the current control signal. Therefore, when the alternating current/direct current converter is in the burst mode, the present invention can make the alternating current/direct current converter enter a state similar to the deep sleep mode. In addition, the controlled-current generation unit can also generate a controlled current flowing through the feedback pin according to the current control signal to control the alternating current/direct current converter to enter or leave the deep sleep mode. Therefore, when the alternating current/direct current converter is in the burst mode or the deep sleep mode, the present invention has advantages as follows: first, the present invention can make the alternating current/direct current converter enter the open loop to decrease power loss of the output feedback unit; second, the present invention can extend switch signal intervals in the burst mode to decrease switch loss of the switch of the primary side; third, the present invention can utilize the controlled-current generation unit to decrease operation current of the active feedback control integrated circuit to decrease power loss of the active feedback control integrated circuit; and fourth, the present invention can present the alternating current/direct current converter from entering an audio frequency band to generate annoying noise.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An active feedback control integrated circuit applied to an alternating current/direct current converter, the active feedback control integrated circuit comprising:
   a feedback pin for receiving a feedback current of an output feedback unit of the alternating current/direct current converter;
   an operation unit coupled to the feedback pin for generating an operation signal according to the feedback current;
   a control unit coupled to the operation unit for generating a current control signal, wherein the control unit comprises:
      a switch having a control terminal coupled to the operation unit for being turned on and turned off according to the operation signal;
      a first current source coupled to a first voltage;
      a capacitor coupled between the first current source and ground; and a second resistor coupled between the switch and the ground;

wherein when the switch is turned off, the current control signal is generated according to the first current source and the capacitor; and when the switch is turned on, the current control signal is generated according to the first current source, the capacitor, and the second resistor; and a controlled-current generation unit coupled to the control unit for generating a controlled current to the feedback pin according to the current control signal.

2. The active feedback control integrated circuit of claim 1, wherein the operation unit comprises:

a first resistor for generating a feedback pin voltage according to the feedback current and the controlled current; and a first operational amplifier for generating and outputting the operation signal according to the feedback pin voltage and a reference voltage.

3. The active feedback control integrated circuit of claim 1, wherein the controlled-current generation unit comprises:

a second operational amplifier coupled to the control unit for receiving the current control signal;

a transistor coupled to the second operational amplifier;

a third resistor coupled between the transistor and the ground, wherein the second operational amplifier, the transistor, and the third resistor are used for generating a controlled reference current according to the current control signal; and a current mirror coupled to the transistor and a second current source for generating and outputting the controlled current according to the controlled reference current and the second current source.

4. An active feedback control integrated circuit applied to an alternating current/direct current converter, the active feedback control integrated circuit comprising:

a feedback pin for receiving a feedback current of an output feedback unit of the alternating current/direct current converter;

an operation unit coupled to the feedback pin for generating an operation signal according to the feedback current;

a control unit coupled to the operation unit for generating a current control signal; and a controlled-current generation unit coupled to the control unit for generating a controlled current to the feedback pin according to the current control signal, wherein the controlled-current generation unit comprises:

a first operational amplifier coupled to the control unit for receiving the current control signal;

a transistor coupled to the first operational amplifier;

a first resistor coupled between the transistor and ground, wherein the first operational amplifier, the transistor, and the first resistor are used for generating a controlled reference current according to the current control signal; and a current mirror coupled to the transistor and a first current source for generating and outputting the controlled current according to the controlled reference current and the first current source.

5. The active feedback control integrated circuit of claim 4, wherein the operation unit comprises:

a second resistor for generating a feedback pin voltage according to the feedback current and the controlled current; and a comparator for generating and outputting the operation signal according to the feedback pin voltage and a reference voltage.

6. The active feedback control integrated circuit of claim 5, wherein the control unit comprises:

a counter coupled to the comparator for generating a number according to the operation signal; and a digital-to-analog converter coupled to the counter for converting the number into the current control signal.

7. An active feedback control integrated circuit applied to an alternating current/direct current converter, the active feedback control integrated circuit comprising:

a feedback pin for receiving a feedback current of an output feedback unit of the alternating current/direct current converter;

an operation unit coupled to the feedback pin for generating an operation signal according to the feedback current;

a control unit coupled to the operation unit for generating a current control signal; and a controlled-current generation unit coupled to the control unit for generating a controlled current to the feedback pin according to the current control signal, wherein the controlled-current generation unit comprises:

a first current source, wherein the first current source is changed according to a detection voltage;

a first switch coupled to a first resistor;

a second switch coupled to a second resistor, the first switch, and the feedback pin; and a third switch coupled to the first current source, the first switch, the second switch, and the feedback pin;

wherein the current control signal is used for controlling turning-on and turning-off of the first switch, the second switch, and the third switch.

8. The active feedback control integrated circuit of claim 7, wherein the operation unit is used for detecting a plurality of switch signals transmitted to a switch of a primary side of an alternating current/direct current converter, and generating and outputting the operation signal to the control unit according to the feedback current and the plurality of switch signals.

9. The active feedback control integrated circuit of claim 8, wherein the plurality of switch signals correspond to the feedback current.

10. An operation method of an active feedback control integrated circuit applied to an alternating current/direct current converter, the active feedback control integrated circuit comprising a feedback pin, an operation unit, a control unit, and a controlled-current generation unit, wherein the controlled-current generation unit comprises a first current source, a first switch, a second switch, and a third switch, the operation method comprising:

receiving an auxiliary voltage generated by the alternating current/direct current converter;

the operation unit detecting a plurality of switch signals transmitted to a switch of a primary side of the alternating current/direct current converter and a feedback current received by the feedback pin from an output feedback unit of the alternating current/direct current converter to generate an operation signal;

the control unit generating and outputting a current control signal according to the operation signal; and the controlled-current generation unit generating a controlled current to the feedback pin by controlling turning-on and turning-off of the first switch, the second switch, and the third switch according to the current control signal.

11. The operation method of claim 10, wherein the control unit generating and outputting the current control signal according to the operation signal comprises:
the control unit generating the current control signal corresponding to the alternating current/direct current converter being in a burst mode and consecutive first predetermined number switch signal intervals in the burst mode being greater than a first predetermined time.

12. The operation method of claim 11, wherein the controlled-current generation unit generating the controlled current to the feedback pin by controlling turning-on and turning-off of the first switch, the second switch, and the third switch according to the current control signal comprises:
turning off the first switch according to the current control signal, and turning on the second switch and the third switch according to the current control signal, wherein the controlled current flowing through the feedback pin is determined by a current provided by the first current source.

13. The operation method of claim 11, further comprising:
after the first switch is turned off according to the current control signal and the second switch and the third switch are turned on according to the current control signal, increasing a current provided by the first current source after the auxiliary voltage is decreased for a predetermined time.

14. The operation method of claim 11, further comprising:
after the first switch is turned off according to the current control signal and the second switch and the third switch are turned on according to the current control signal, a current provided by the first current source being turned off when the auxiliary voltage is greater than a high predetermined voltage.

15. The operation method of claim 12, wherein the control unit generating and outputting the current control signal according to the operation signal comprises:
after the first switch is turned off according to the current control signal and the second switch and the third switch are turned on according to the current control signal, the control unit generating the current control signal corresponding to a second predetermined time comprising second predetermined number switch signals after the switch of the primary side is turned on.

16. The operation method of claim 15, wherein the controlled-current generation unit generating the controlled current to the feedback pin by controlling turning-on and turning-off of the first switch, the second switch, and the third switch according to the current control signal comprises:
turning on the first switch according to the current control signal and turning off the second switch and the third switch according to the current control signal, wherein the controlled current flowing through the feedback pin is determined by a first voltage received by the first resistor and the first resistor.

17. An operation method of an active feedback control integrated circuit applied to an alternating current/direct current converter, the active feedback control integrated circuit comprising a feedback pin, an operation unit, a control unit, and a controlled-current generation unit, the operation method comprising:
the feedback pin receiving a feedback current of an output feedback unit of the alternating current/direct current converter;
the operation unit generating an operation signal according to the feedback current;
the control unit controlling turning-on and turning-off of a switch of the control unit according to the operation signal;
the control unit generating a current control signal according to turning-on and turning-off of the switch of the control unit; and
the controlled-current generation unit generating a controlled current to the feedback pin according to the current control signal.

18. The operation method of claim 17, wherein the operation unit generating the operation signal according to the feedback current comprises:
generating a feedback pin voltage according to the feedback current and the controlled current; and
generating and outputting the operation signal according to the feedback pin voltage and a reference voltage.

19. The operation method of claim 17, wherein the controlled-current generation unit generating the controlled current to the feedback pin according to the current control signal comprises:
receiving the current control signal;
generating a controlled reference current according to the current control signal; and
generating and outputting the controlled current according to the controlled reference current and a current provided by a first current source.

20. An operation method of an active feedback control integrated circuit applied to an alternating current/direct current converter, the active feedback control integrated circuit comprising a feedback pin, an operation unit, a control unit, and a controlled-current generation unit, the operation method comprising:
the feedback pin receiving a feedback current of an output feedback unit of the alternating current/direct current converter;
the operation unit generating an operation signal according to the feedback current;
the control unit generating a number according to the operation signal;
the control unit converting the number into the current control signal; and
the controlled-current generation unit generating a controlled current to the feedback pin according to the current control signal.

21. The operation method of claim 20, wherein the controlled-current generation unit generating the controlled current to the feedback pin according to the current control signal comprises:
receiving the current control signal;
generating a controlled reference current according to the current control signal; and
generating and outputting the controlled current according to the controlled reference current and a current provided by a first current source.

22. The operation method of claim 20, wherein the operation unit generating the operation signal according to the feedback current comprises:
generating a feedback pin voltage according to the feedback current and the controlled current; and
generating and outputting the operation signal according to the feedback pin voltage and a reference voltage.

* * * * *